United States Patent
Song

(10) Patent No.: US 12,536,892 B2
(45) Date of Patent: Jan. 27, 2026

(54) METHOD FOR TRANSMITTING EMERGENCY RESCUE SIGNAL BY ACCESSORY DEVICE COMMUNICATING WITH USER TERMINAL

(71) Applicant: JIASOFT Corp., Seoul (KR)

(72) Inventor: Jung Sik Song, Gyeongju-si (KR)

(73) Assignee: JIASOFT Corp., Seoul (KR)

( * ) Notice: Subject to any disclaimer, the term of this patent is extended or adjusted under 35 U.S.C. 154(b) by 170 days.

(21) Appl. No.: 18/521,632

(22) Filed: Nov. 28, 2023

(65) Prior Publication Data
US 2025/0148900 A1    May 8, 2025

(30) Foreign Application Priority Data
Nov. 3, 2023  (KR) .......................... 10-2023-0150952

(51) Int. Cl.
*G08B 25/00*     (2006.01)
*H04W 76/50*    (2018.01)

(52) U.S. Cl.
CPC .......... *G08B 25/003* (2013.01); *H04W 76/50* (2018.02)

(58) Field of Classification Search
CPC .. G08B 25/016; G08B 25/009; G08B 25/006; G08B 29/12; H04W 76/50
See application file for complete search history.

(56) References Cited

U.S. PATENT DOCUMENTS

| | | | |
|---|---|---|---|
| 2013/0179919 A1* | 7/2013 | Ostermeier .......... | H04N 21/814 725/33 |
| 2014/0176329 A1* | 6/2014 | Kim ................... | G08B 21/0453 340/539.11 |
| 2015/0002293 A1* | 1/2015 | Nepo .................... | A61K 9/703 340/539.11 |
| 2016/0379473 A1* | 12/2016 | Bharti ................. | G08B 21/182 340/539.11 |
| 2022/0172599 A1* | 6/2022 | Mehta ................. | G08B 25/006 |

FOREIGN PATENT DOCUMENTS

| | | |
|---|---|---|
| JP | 2003-289569 A | 10/2003 |
| JP | 2015-111918 A | 6/2015 |
| KR | 10-1616469 B1 | 4/2016 |
| KR | 10-2217219 B1 | 2/2021 |
| KR | 10-2491615 B1 | 1/2023 |

\* cited by examiner

*Primary Examiner* — Mirza F Alam
(74) *Attorney, Agent, or Firm* — Studebaker Brackett PLLC

(57) ABSTRACT

Provided is a method of transmitting an emergency rescue signal by an accessory device communicating with a user terminal, the method including providing a trigger signal from the accessory device to the user terminal in response to a push input applied to a switch included in the accessory device, generating at least one of image data and audio data related to a user's state on the basis of the trigger signal, and providing, as an emergency rescue signal, user state data associated with the image data and the audio data to a management server.

6 Claims, 11 Drawing Sheets

METHOD FOR TRANSMITTING EMERGENCY RESCUE SIGNAL BY ACCESSORY DEVICE COMMUNICATING WITH USER TERMINAL

CROSS-REFERENCE TO RELATED APPLICATION

This application claims priority to and the benefit of Korean Patent Application No. 10-2023-0150952, filed on Nov. 3, 2023, the disclosure of which is incorporated herein by reference in its entirety.

BACKGROUND

1. Field of the Invention

The present disclosure relates to a method of transmitting an emergency rescue signal, and more particularly, to a method of transmitting an emergency rescue signal by an accessory device communicating with a user terminal wirelessly.

2. Discussion of Related Art

Recently, smart phones have come into widespread use, smart phones with a function of generating an emergency rescue signal are being developed, and the demand for services related to emergency rescue systems is steadily increasing. An emergency rescue signal is generated by directly physically pressing a function button on a smart phone, and may be provided to a security management center through a carrier server.

However, conventionally, an emergency rescue signal is used to perform only very limited functions with the lack of connection with other applications. In addition, it is very difficult for an individual in an emergency situation to secure his or her smart phone and operate the smart phone calmly.

The function button on the smart phone is provided in a very small size in consideration of aesthetic aspects, and the pressing thereof is accompanied by several operations to prevent malfunction, thus interfering with generation of a request signal even in an emergency situation.

That is, an additional device is needed to generate an emergency rescue signal but a device in which a button for generation of a signal is large in size but is prevented from being pressed by mistake not to malfunction and which is designed in portable size and weight has yet to be introduced. Furthermore, a signal transmission method for stably generating an emergency rescue signal by such a device while securing safety for personal information has yet to be introduced.

SUMMARY OF THE INVENTION

The present disclosure is directed to providing a method of generating an emergency rescue signal through an accessory device separate from a user terminal and transmitting the emergency rescue signal to a management server.

An aspect of the present disclosure provides a method of transmitting an emergency rescue signal by an accessory device communicating with a user terminal, the method including providing a trigger signal from the accessory device to the user terminal in response to a push input applied to a switch included in the accessory device, generating at least one of image data and audio data related to a user's state on the basis of the trigger signal, and providing, as an emergency rescue signal, user state data associated with the image data and the audio data to a management server.

In an embodiment, the providing of, as the emergency rescue signal, the user state data associated with the image data and the audio data to the management server may include encrypting the image data and the audio data as the user state data.

In an embodiment, the accessory device may be connected to the user terminal through Bluetooth communication, and the method may further include giving access authority to access the accessory device to the user terminal when an operation requested by the user terminal is performed by the accessory device.

In an embodiment, the generating of at least one of the image data and the audio data may include generating, by the user terminal, at least one of the image data and the audio data unless an operation is input to the user terminal for a certain time period or more.

In an embodiment, the generating of at least one of the image data and the audio data may include generating first audio data by recording surround sound for a first time period on the basis of the trigger signal, and generating second audio data by recording surround sound for a second time period longer than the first time period after the generation of the first audio data.

In an embodiment, the generating of at least one of the image data and the audio data may further include generating third audio data by recording surround sound for a third time period shorter than the first time period in response to a failure of the transmission of the first audio data to the management server.

In an embodiment, the method may further include identifying, by the management server, a guardian terminal requesting pairing with the user terminal; and transmitting the emergency rescue signal to the guardian terminal by at least one of the management server and the user terminal, in response to approval of the request for the pairing with the user terminal from the guardian terminal.

In an embodiment, the method may further include providing information about the user and location information of the user terminal to a security management center near a location of the user terminal, when the management server receives the emergency rescue signal a predetermined number of times or more.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
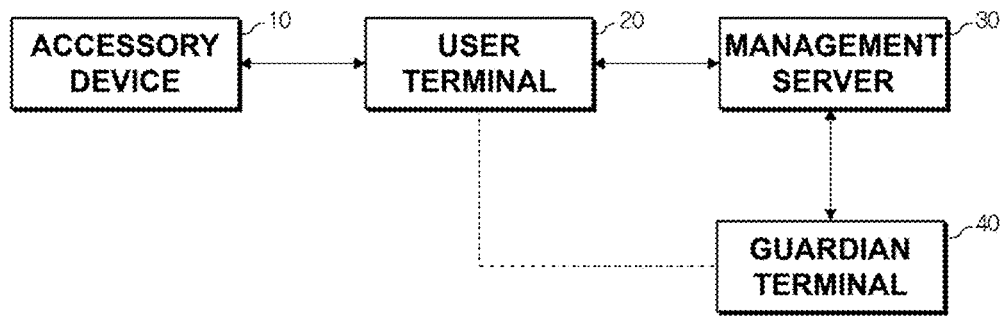
FIG. 1 is a block diagram illustrating components of an emergency rescue request system according to an embodiment of the present disclosure.

Hereinafter, various embodiments of the present disclosure will be described in connection with the accompanying drawings. Various changes may be made in various embodiments of the present disclosure and the present disclosure may be implemented in many different forms. Exemplary embodiments are illustrated in the drawings and will be described in detail herein. However, it should be understood that the present disclosure is not limited to particular embodiments and includes all modifications and/or equivalents or alternatives falling within the idea and scope of the present disclosure. In describing the drawings, like reference numerals are assigned to like components.

It should be understood that in various embodiments of the present disclosure, the terms "comprise" and/or "comprising," used herein specify the presence of stated features, integers, steps, operations, elements, components, or a combination thereof, but do not preclude the presence or addition of one or more features, integers, steps, operations, elements, components, or a combination thereof.

In various embodiments of the present disclosure, the term "or" and the like should be understood to include any and all combinations of items listed together. For example, the expression "A or B" should be understood to include A, B or both A and B.

Expressions such as "first" and "second" used in various embodiments of the present disclosure may be used to modify various components in various embodiments but these components are not limited thereby. For example, the order and/or importance of these components is not limited thereby and the above expressions may be used to distinguish one component from another.

It should be understood that when a component is referred to as being "coupled to" or "connected to" another component, the component may be directly coupled to or connected to the other component but another component may be interposed therebetween.

In embodiments of the present disclosure, a term such as "module," "unit" or "part" is used to indicate a component that performs at least one function or operation, and the components may be implemented by hardware, software, or a combination of hardware and software. "Modules," "units," "parts" or the like may be integrated in at least one module or chip to form at least one processor unless each of them need be implemented individually as specific hardware.

Terms such as those defined in a commonly used dictionary should be interpreted as having meanings consistent with meanings in the context of related technologies and should not be interpreted with ideal or excessively formal meanings unless explicitly defined herein.

Hereinafter, embodiments of the present disclosure will be described in detail with reference to the accompanying drawings.

FIG. 1 is a block diagram illustrating components of an emergency rescue request system 1 according to an embodiment of the present disclosure.

Referring to FIG. 1, the emergency rescue request system 1 may include an accessory device 10, a user terminal 20, and a management server 30. The user terminal 20 may be connected to the accessory device 10 and the management server 30 to communicate with the accessory device 10 and the management server 30, and transmit an emergency rescue signal to the management server 30 upon receipt of a trigger signal from the accessory device 10.

In an embodiment, the accessory device 10 and the user terminal 20 may be connected through short-range wireless communication, and one accessory device 10 may perform wireless communication with one user terminal 20. In contrast, one user terminal 20 may be communicatively connected to a plurality of accessory devices 10, and a list of accessory devices 10 communicatively connected to the user terminal 20 may be checked through an application installed in the user terminal 20.

The management server 30 may receive an emergency rescue signal from the user terminal 20. The generated emergency rescue signal may include encrypted user state data, and the user state data may include image data and/or audio data obtained by the user terminal 20. The image data and/or the audio data may be obtained by executing a camera application and/or a recording application installed in the user terminal 20.

To obtain the image data and the audio data with the user terminal 20, the authority to control an application for obtaining image data and audio data should be given to an emergency rescue application for signal transmission and reception in connection with the accessory device 10. That is, in order to generate an emergency rescue signal with the user terminal 20, the authority to control the camera application and the recording application should be preemptively given to the emergency rescue application. In addition, the user terminal 20 may give to the emergency rescue application the authority to control an application that obtains Global Positioning System (GPS) data to obtain terminal location information as user state data.

According to an embodiment, when the emergency rescue application is initially set, the user terminal 20 may ask a user to select an application to which control authority is to be given, and give control authority for the selected application to the emergency rescue application.

For example, when the user terminal 20 gives the authority to control only the camera application to the emergency rescue application according to a user's selection input, only image data captured by the camera application may be generated as user state data. On the other hand, when the user terminal 20 gives the authority to control the camera application and the recording application to the emergency rescue application according to the user's selection input, image data captured by the camera application and audio data recorded by the recording application may be generated as user state data. The user terminal 20 may generate an emergency rescue signal on the basis of the generated user state data and provide the emergency rescue signal to the management server 30. Data obtained by the user terminal 20 will be described in detail with reference to FIG. 6 below.

According to an embodiment, the management server 30 may identify a guardian terminal 40 requesting pairing with the user terminal 20, and the management server 30 or the user terminal 20 may approve the guardian terminal 40 to pair with the user terminal 20. Upon receiving an emergency rescue signal from the user terminal 20, the management server 30 may transmit the emergency rescue signal to the guardian terminal 40 paired therewith. In this case, the management server 30 may decode user state data included in the emergency rescue signal and provide the decoded user state data to the guardian terminal 40, but embodiments of the present disclosure are not limited thereto and only alarm information indicating the transmission of the emergency rescue signal to the management server 30 may be provided.

Figure 2:
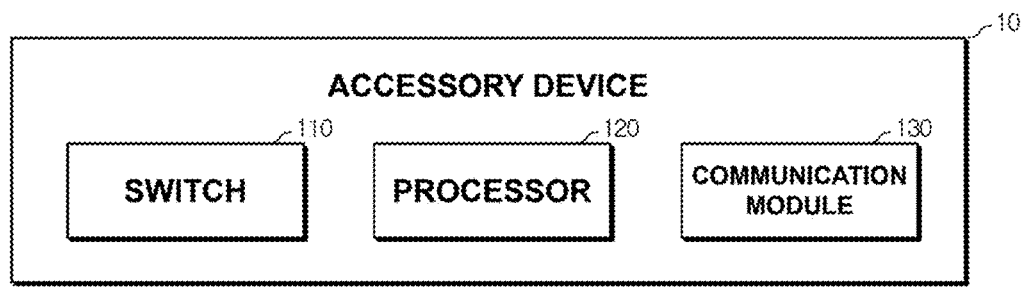
FIG. 2 is a block diagram illustrating components of an accessory device according to an embodiment.

FIG. 2 is a block diagram illustrating components of an accessory device 10 according to an embodiment.

The accessory device 10 may be a terminal accessory device 10 detachably attached to the user terminal 20 or a stationary accessory device 10 detachably attached to an object other than the user terminal 20. The accessory device 10 may be a portable device that a user may carry with him or her when detached from the user terminal 20 or object.

Referring to FIG. 2, the accessory device 10 may include a switch 110, a processor 120, and a communication module 130 that may be mounted on a single substrate together. The switch 110 may be connected to a button exposed to the outside, e.g., a path in which power is supplied from a battery or a power supply to the processor 120 and/or the communication module 130 when a user presses the button. The processor 120 and the communication module 130 supplied with power may generate a trigger signal under certain conditions and transmit the trigger signal to the user terminal 20.

A configuration in which the switch 110 of the accessory device 10 is turned on by an external button to generate and transmit a trigger signal will be described in detail with reference to FIGS. 7A to 12 below.

A communication method of the communication module 130 may include at least one short-range wireless communication method among Bluetooth, ZigBee, beacon, radio-frequency identification (RFID), ultra-wideband (UWB), and infrared communication. That is, the accessory device 10 may be connected to the user terminal 20 by a short-range wireless communication method to transmit a trigger signal.

In an embodiment, when the accessory device 10 is connected to the user terminal 20 by a short-range wireless communication method to allow the accessory device 10 to perform an operation requested by the user terminal 20, the user terminal 20 and the accessory device 10 may be paired with each other and the authority to access the accessory device 10 may be given to an emergency rescue application installed in the user terminal 20. The access authority may be authority to receive a trigger signal, and the user terminal 20 may control a camera application and/or a recording application in response to giving the access authority to a target access device 10.

In this case, the user terminal 20 may request a certain operation to identify a user of the target accessory device 10 through the emergency rescue application. For example, the user terminal 20 may request a button of the target accessory device 10 to be pressed three times, and give the authority to access the target accessory device 10 when a user presses the target accessory device 10 three times.

That is, pairing between the user terminal 20 and the accessory device 10 is requested and checked unilaterally by the user terminal 20, and thus the accessory device 10 may be unintentionally paired with an undesired user terminal 20. Accordingly, even when the user terminal 20 and a target accessory device 10 are paired by the communication module 130, the user terminal 20 may be identified as a terminal connected by mistake to prevent user state data from being obtained fraudulently by the target accessory device 10 when the authority to access the target accessory device 10 is not given to an application layer.

Figure 3:
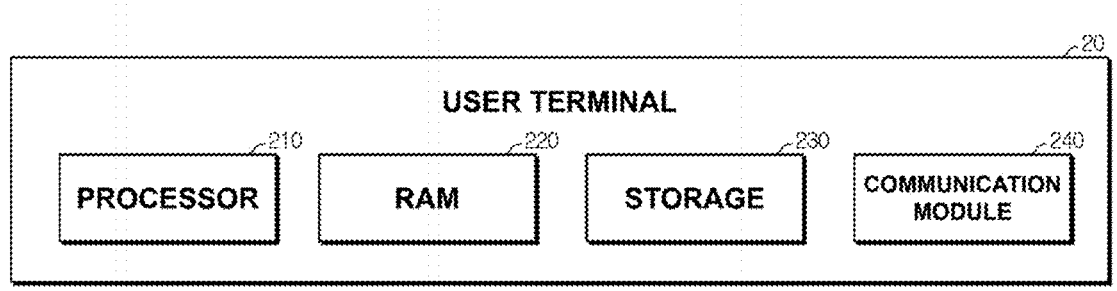
FIG. 3 is a block diagram illustrating components of a user terminal according to an embodiment.

FIG. 3 is a block diagram illustrating components of a user terminal 20 according to an embodiment.

Referring to FIG. 3, the user terminal 20 may include a processor 210, a random access memory (RAM) 220, a storage 230, and a communication module 240.

The processor 210 may control overall operations of the user terminal 20. The processor 210 may include either a single processor core or a central processing unit (CPU) with multiple processor cores. The user terminal 20 may include one or more processors 210.

The processor 210 may process or execute a program, data or instructions stored in the storage 230. For example, the processor 210 may execute programs stored in the storage 230 to obtain image data and/or voice data and process the obtained data to generate user state data. Furthermore, the processor 210 may generate an emergency rescue signal from the generated user state data and provide the emergency rescue signal to the management server 30 according to a communication protocol.

The RAM 220 may temporarily store programs, data or instructions. For example, the programs and/or data stored in the storage 230 may be temporarily stored in the RAM 220 under control of the processor 210 or according to booting code. Examples of the RAM 220 include a dynamic RAM (DRAM), a static RAM (SRAM), a synchronous DRAM (SDRAM), etc.

The storage 230 is a storage place for storing data, and may store an operating system (OS), various programs, and various types of data. The storage 230 includes a read-only memory (ROM), a flash memory, a phase-change RAM (PRAM), a magnetic RAM (MRAM), a resistive RAM (RRAM), a ferroelectric RAM (FRAM), or the like. In an embodiment, the storage 230 may be embodied as a hard disk drive (HDD), a solid-state drive (SSD), or the like.

The communication module 240 may transmit and/or receive data of the user terminal 20. For example, the communication module 240 may transmit or receive data by various communication methods. For example, the communication module 240 may perform communication by a communication method, e.g., 3G, LTE, Wi-Fi, Bluetooth, Bluetooth low energy (BLE), ZigBee, near-field communication (NFC), a communication method using ultrasonic waves, or the like, and the communication may include communication, wireless communication, short-range communication, and long-distance communication.

According to an embodiment, the user terminal 20 may transmit and receive data/information to and from the accessory device 10 through short-range wireless communication, and transmit and receive data/information to and from the management server 30 using long-distance wireless communication.

Therefore, the user terminal 20 of the present disclosure may perform an operation using the above-described components, temporarily store data or instructions, or transmit and/or receive data to/from other user terminals 20.

The user terminal 20 is applicable to a smart TV, a smart phone, a mobile device, an image display device, a measuring device, an Internet-of-Things (IoT) device, etc., and may be implemented by being applied to one of various types of electronic devices.

The user terminal 20 may include various types of Internet protocol (IP) blocks. For example, although not shown in FIG. 3, the user terminal 20 may further include an input/output device, and other general-purpose components such as a neural network processor, a multi-format codec (MFC), a video module (e.g., a camera interface, a Joint Photographic Experts Group (JPEG) processor, a video processor, a mixer or the like), a three-dimensional (3D) graphics core, an audio system (1), a display driver, a graphics processing unit (GPU), and a digital signal processor (DSP).

According to an embodiment, at least some of the components of the user terminal 20 may be embodied together as one semiconductor chip, and for example, the user terminal 20 may be embodied as a system-on-chip (SoC). However, embodiments are not limited thereto, and the user terminal 20 may be embodied as a plurality of semiconductor chips. According to an embodiment, the user terminal 20 may be embodied as an application processor mounted on a mobile device.

Figure 4:
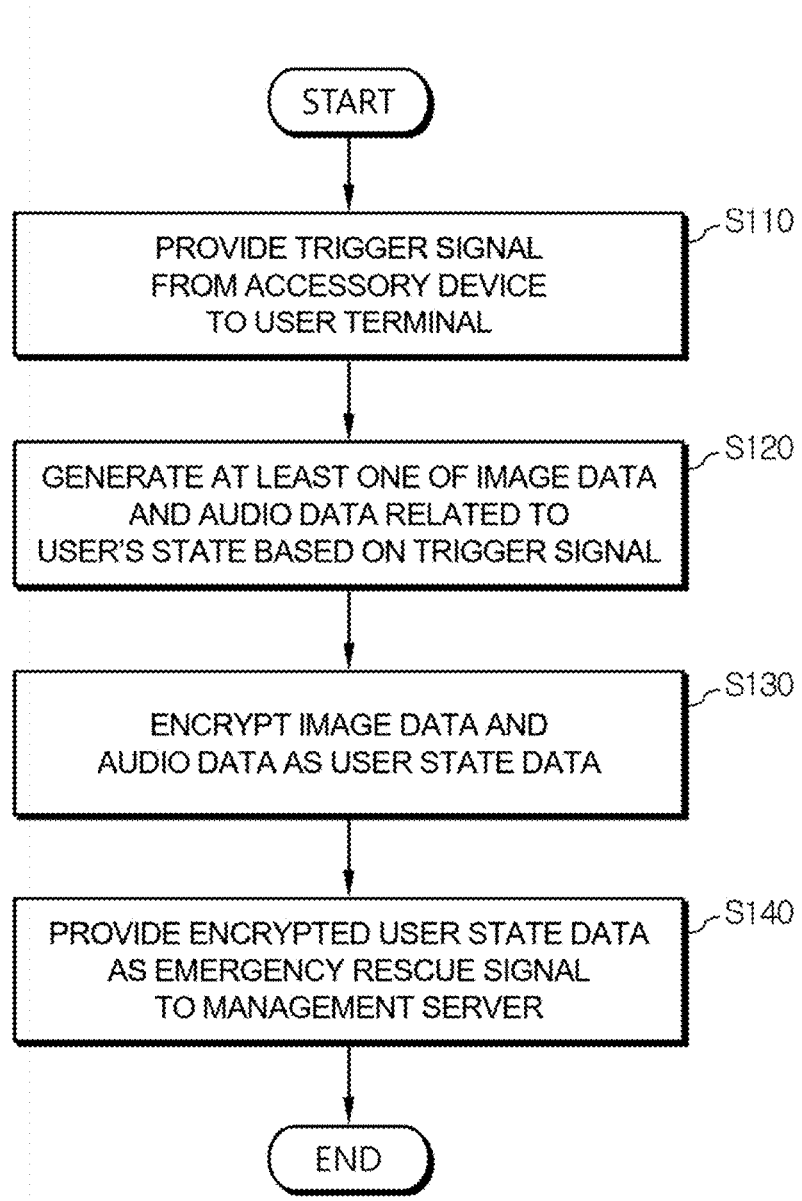
FIG. 4 is a flowchart of a method of generating an emergency rescue signal according to an embodiment.

FIG. 4 is a flowchart of a method of generating an emergency rescue signal according to an embodiment.

Referring to FIG. 4, when a trigger signal is generated by the accessory device 10 and provided to the user terminal 20, an emergency rescue signal may be generated and provided to the management server 30. While the emergency rescue application is running as a background application, the trigger signal may be a control signal of the user terminal 20 that allows the emergency rescue application to operate a camera application/recording application that has passed a normal access authentication process.

In operation S110, the accessory device 10 may provide a trigger signal to the user terminal 20 when a push input is applied to the switch. For example, the trigger signal may be a communication signal subject to a protocol of Bluetooth communication or a signal transmitted to the user terminal 20 paired through Bluetooth communication.

In operation S120, upon receiving the trigger signal from the accessory device 10, the user terminal 20 may generate at least one of image data and audio data related to a user's state on the basis of the trigger signal. When the user terminal 20 is paired with a plurality of accessory devices 10, the user terminal 20 may generate at least one of image data and audio data upon receiving the trigger signal from at least one of the plurality of accessory devices 10.

The image data may be automatically captured under control of the emergency rescue application without a user's manipulation when the camera application is run. All cameras included in the user terminal 20 may be activated and images of surroundings of the user may be captured by the cameras as soon as the user terminal 20 receives the trigger signal.

The audio data may be automatically recorded under control of the emergency rescue application without the user's manipulation when the recording application is run. In this case, the user terminal 20 may generate first audio data by recording surround sound for a first time period, and determine a time period length of audio data to be generated thereafter according to whether the first audio data is successfully transmitted to the management server 30.

According to an embodiment, the user terminal 20 may generate first audio data by recording surround sound for the first time period on the basis of the trigger signal, and generate second audio data by recording surround sound for a second time period longer than the first time period. For example, the first time period may be 10 seconds, and the second time period may be 30 seconds. The first time period may be a minimum time period required for the user terminal 20 or the management server 30 to determine a surrounding situation, and the second time period may be a minimum time period required to collect evidence. When generating an emergency rescue signal, a surrounding situation should be determined prior to collecting evidence, and thus audio data may be collected for the first time period shorter than the second time period and transmitted to the management server 30.

The user terminal 20 of the present disclosure may transmit the first audio data to the management server 30 before the second audio data is generated, and generate the second audio data when the transmission of the first audio data succeeds. When the transmission of the first audio data fails, the user terminal 20 may generate third audio data by recording surrounding sound for a third time period shorter than the first time period. The failure of the transmission of the first audio data may be due to a large data size of the emergency rescue signal, which is generated based on the first audio data, compared to data communication quality or an error in communication between the management server 30 and the user terminal 20. Accordingly, the user terminal 20 may generate the third audio data to be smaller in size than the first audio data, and retransmit the emergency rescue signal to the management server 30 based on the generated third audio data.

In this case, the third time period of the third audio data may be determined according to whether the retransmission of the emergency rescue signal is successful or on the basis of the type of communication with the management server 30/signal strength. For example, the user terminal 20 may determine the third time period according to whether the user terminal 20 is communicating with the management server 30 through WIFI or LTE.

In operation S130, the user terminal 20 may encrypt data collected through the camera application or the recording application as user state data. For example, the user terminal 20 may encrypt the collected data as user state data using a private encryption key, and the management server 30 may decrypt the encrypted user state data using a public encryption key that is paired with the private encryption key and stored in the management server 30. Alternatively, the user terminal 20 may encrypt the image data and the audio data as the user state data using any of various encryption methods, and the user state data may be decrypted into the image data and the audio data using a decryption key that corresponds to an encryption method used for the encryption and is stored in the management server 30.

In operation S140, the user terminal 20 may provide the encrypted user state data as an emergency rescue signal to the management server 30. The user terminal 20 may generate a data packet according to a protocol matching the type of communication established with the management server 30, and in this case, the user state data may be transmitted in the data packet to the management server 30.

According to an embodiment, when the emergency rescue signal is received a predetermined number of times or more, the management server 30 may search for a security management center near the user terminal 20 and provide information about the user and location data of the user terminal 20 to a located security management center. Accordingly, the management server 30 may automatically notify the security management center about the user's emergency rescue situation even when no measure is taken.

Figure 5:
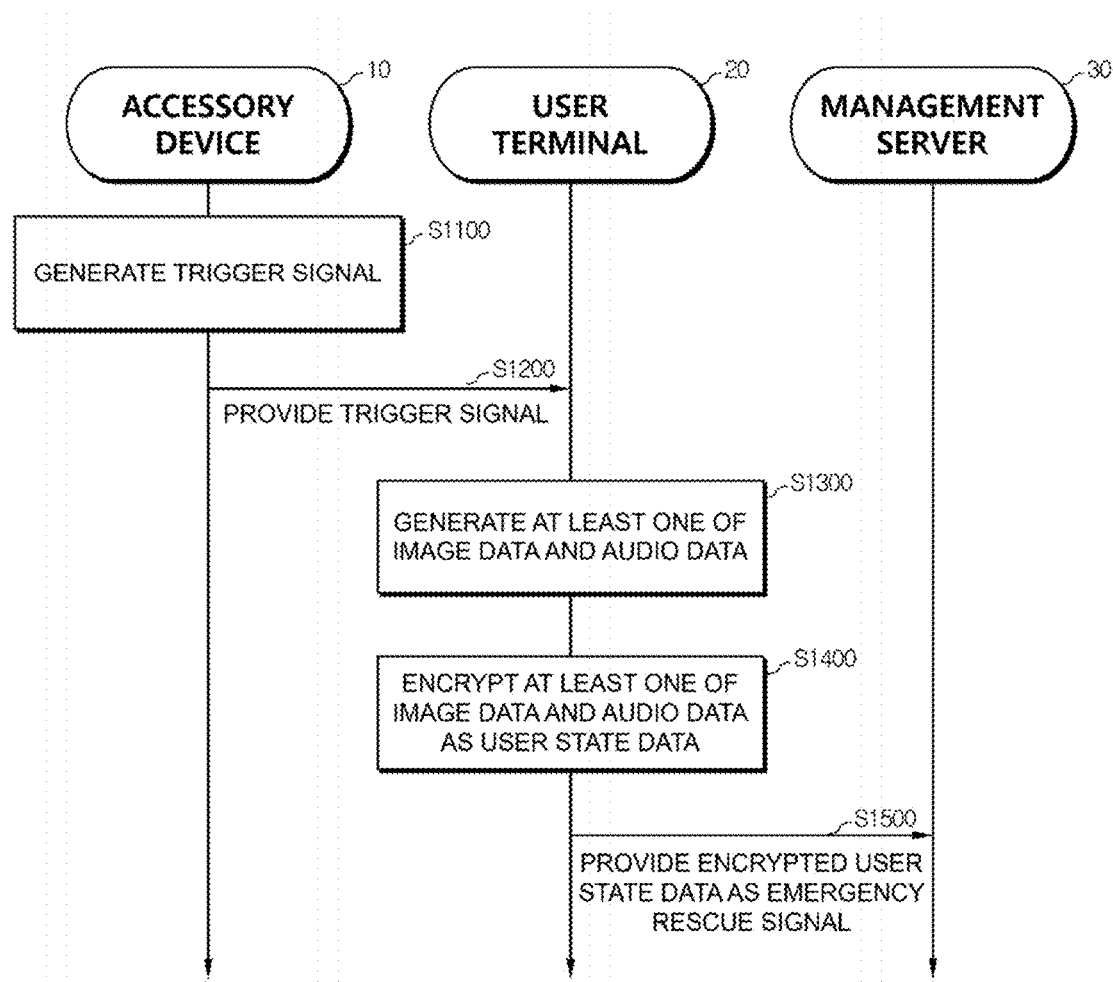
FIG. 5 is a flowchart of a method of providing an emergency rescue signal to a management server as a series of signals is generated/transmitted from an accessory device to the management server, according to an embodiment.

FIG. 5 is a flowchart of a method of providing an emergency rescue signal to a management server 30 as a series of signals is generated/transmitted from an accessory device 10 to the management server 30, according to an embodiment.

Referring to FIG. 5, the management server 30 may be notified of a user's emergency situation by a series of signals being sequentially transmitted from the accessory device 10 to the management server 30. In operation S1100, the accessory device 10 may generate a trigger signal. In operation S1200, the accessory device 10 may provide the trigger signal to a user terminal 20. In this case, the accessory device 10 may provide the trigger signal to the user terminal 20 through short-range wireless communication.

In operation S1300, the user terminal 20 may generate at least one of image data and audio data. In operation S1400, the user terminal 20 may encrypt at least one of the image data and the audio data as user state data. In this case, when both the image data and the audio data are obtained, the user terminal 20 may combine the image data and the audio data and encrypt the combination of the image data and the audio data as user state data.

In operation S1500, the user terminal 20 may provide the encrypted user state data as an emergency rescue signal to the management server 30. The user terminal 20 may provide the emergency rescue signal to the management server 30 through long-distance wireless communication.

Figure 6:
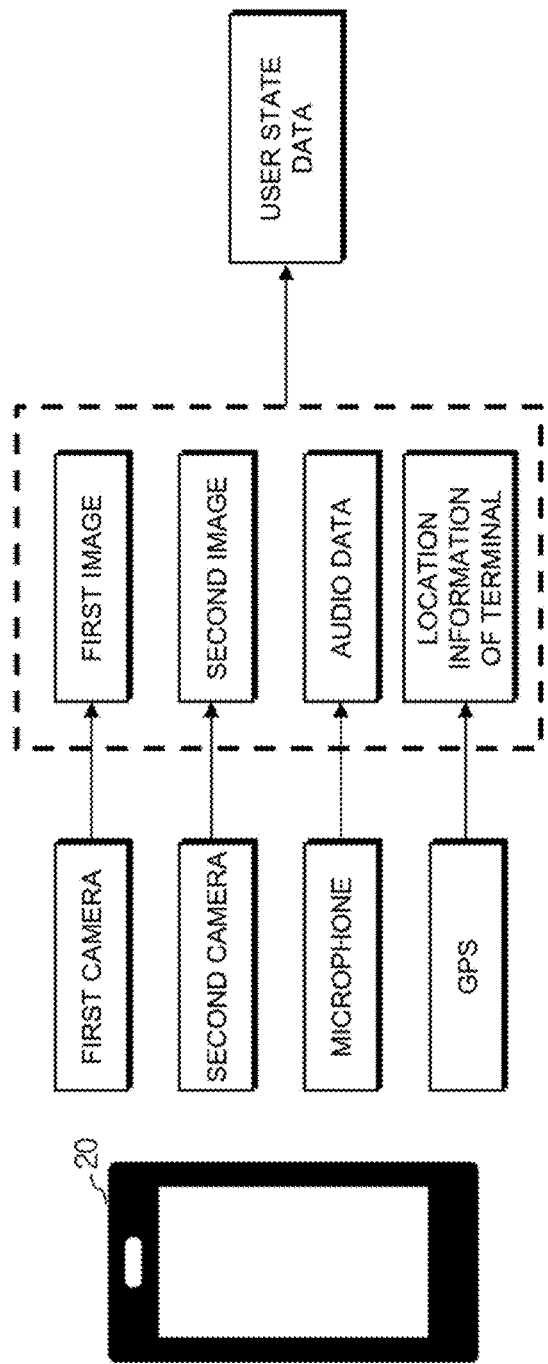
FIG. 6 is a diagram illustrating a method of generating user state data from data generated by a user terminal according to an embodiment.
Figure 7A:
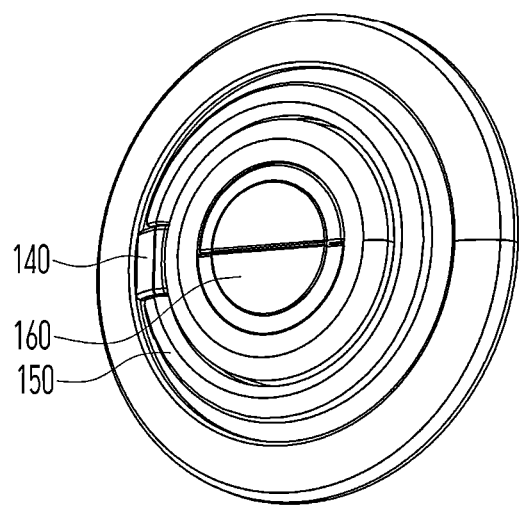
FIGS. 7A to 10 are diagrams illustrating components of an accessory device according to a first embodiment.
Figure 7B:
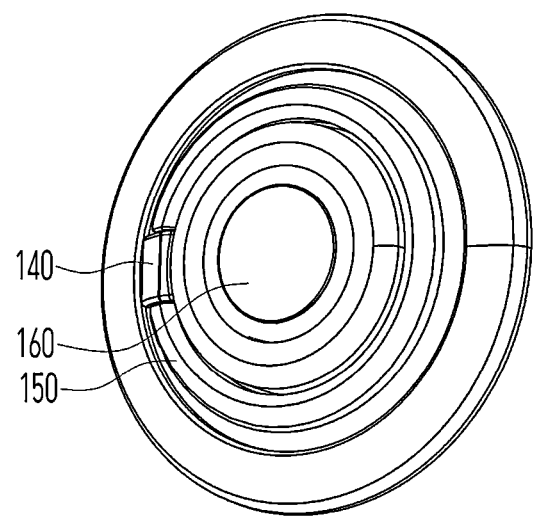
Figure 8A:
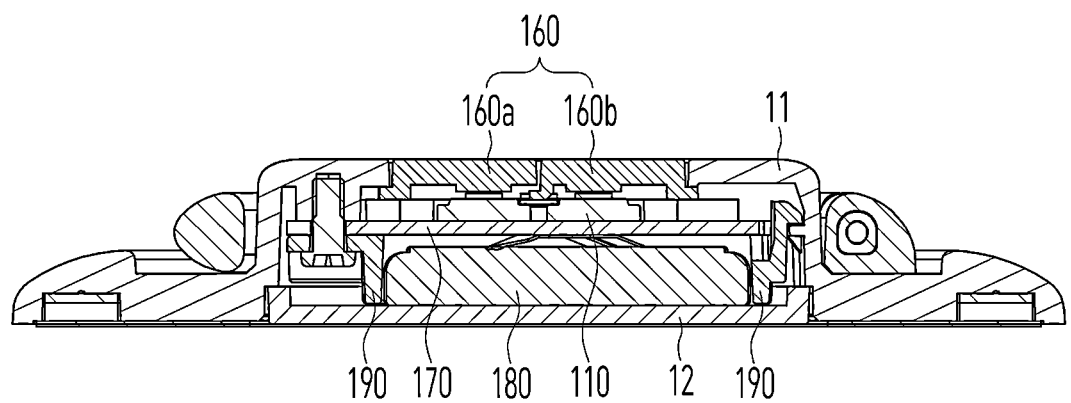
Figure 8B:
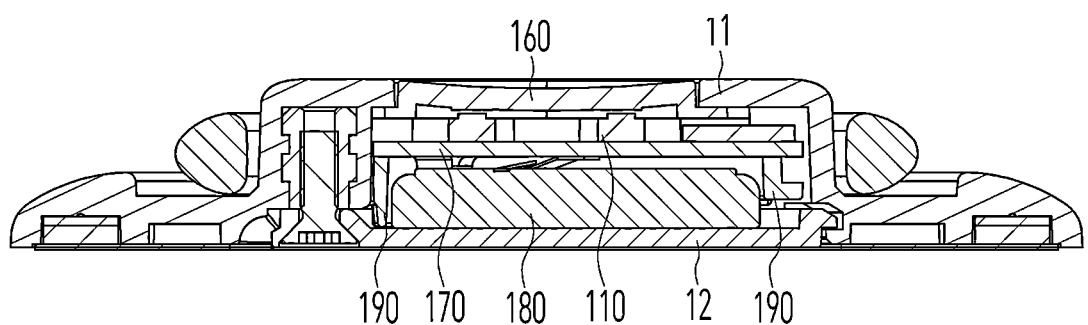
Figure 9A:
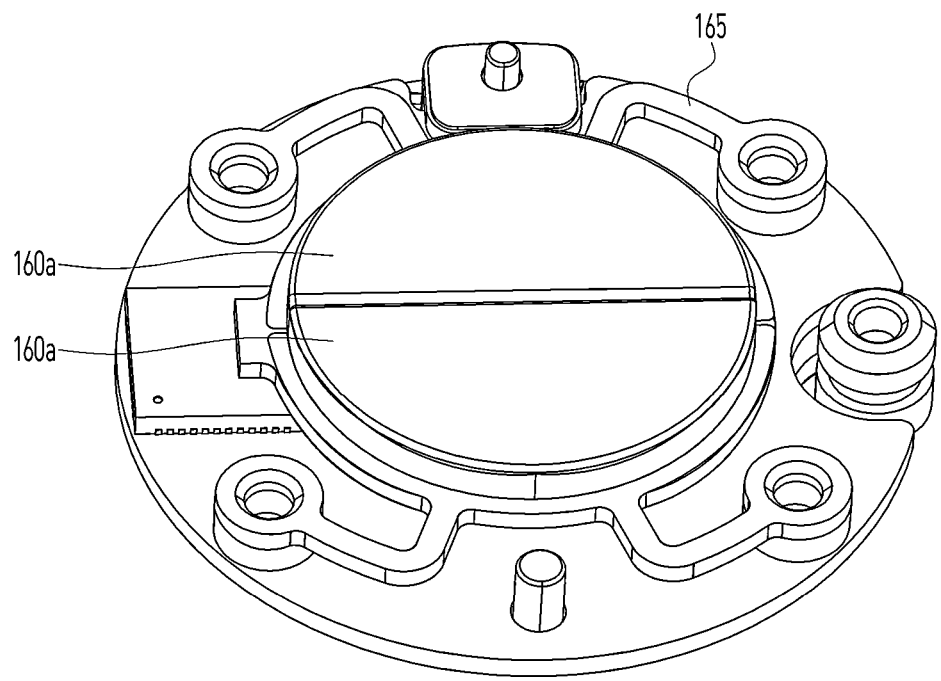
Figure 9B:
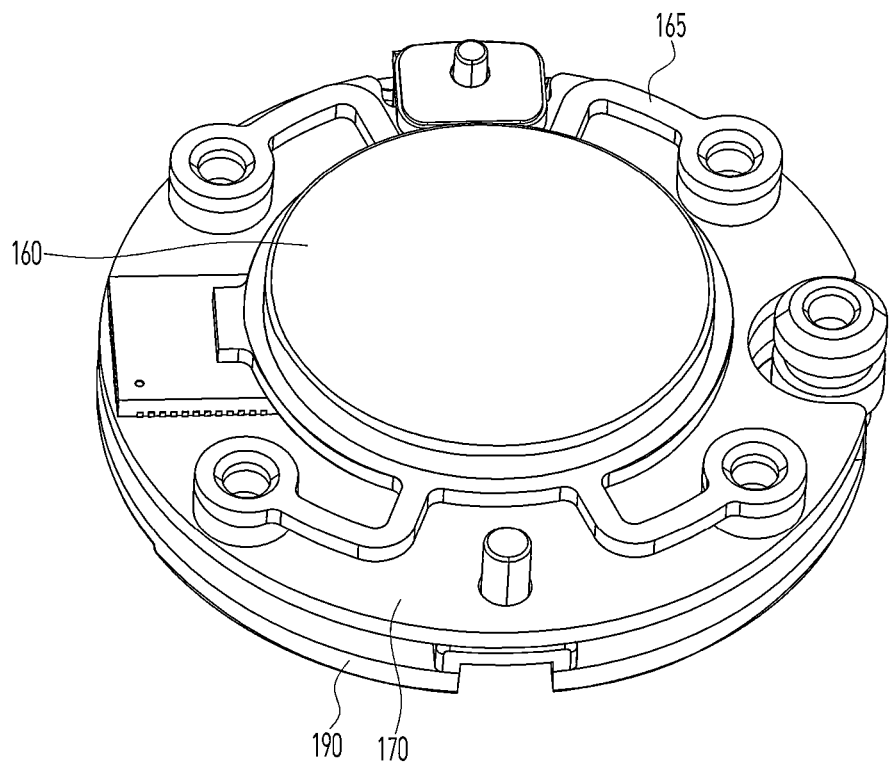
Figure 10:
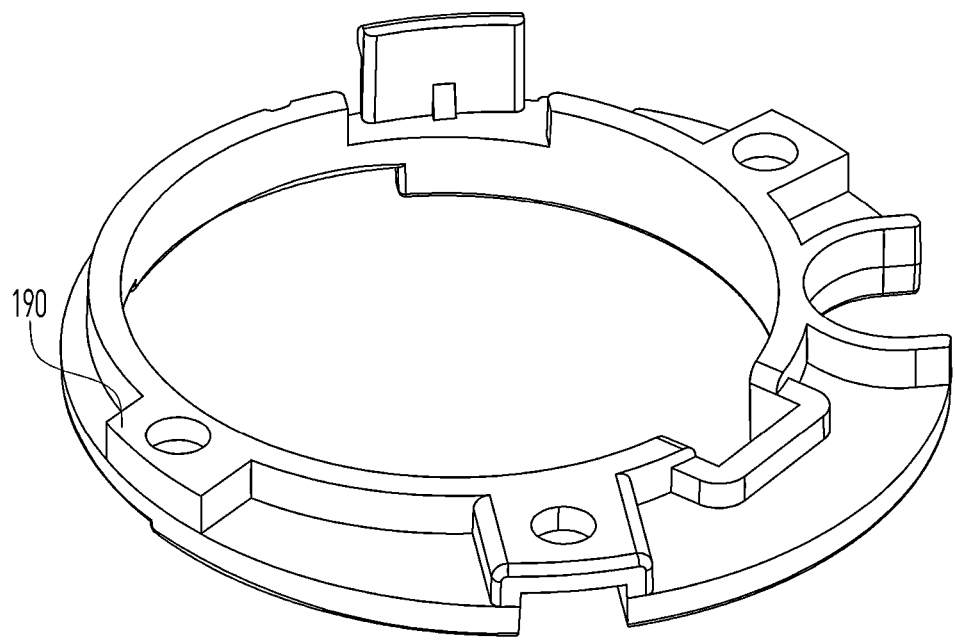

FIG. 6 is a diagram illustrating a method of generating user state data from data generated by a user terminal 20 according to an embodiment.

Referring to FIG. 6, data identifying a user's state may be collected through a plurality of functional devices included in the user terminal 20 and be merged to generate user state data. In this case, the user state data may be data obtained by merging and encrypting multiple types of data. The multiple types of data may include image data, audio data, and terminal location data, and when the user terminal 20 includes a first camera and a second camera, first image data and second image data captured simultaneously by the first and second cameras may be used to generate user state data.

According to an embodiment, a combination of collected data may vary according to control authority given to an emergency rescue application in the user terminal 20 and the types of functional devices included in the user terminal 20. When the authority to control a camera application and a recording application is given to the emergency rescue application, the user terminal 20 may obtain image data and audio data. Upon obtaining the authority to control an application that obtains GPS data to obtain terminal location information as user state data, the user terminal 20 may obtain terminal location information.

In addition, the user terminal 20 may obtain connection strength data with respect to the accessory device 10 transmitting a trigger signal. When the user terminal 20 communicates with the accessory device 10 through Bluetooth communication, a signal strength indicator (RSSI) value may be obtained through a trigger signal, and connection strength data may be generated on the basis of the RSSI value.

When the management server 30 obtains the connection strength data by decrypting the user state data, the distance between the accessory device 10 and the user terminal 20 may be inferred according to the connection strength data, and the guardian terminal 40 or the user terminal 20 may be informed of the user's state according to the inferred distance.

For example, when the connection strength data indicates that the inferred distance is large, the management server 30 may display that the user who is carrying the accessory device 10 with him or her is distant from the user terminal 20 through an application installed in the user terminal 20 or the guardian terminal 40. That is, it may be understood that the emergency rescue signal has been transmitted in a situation in which the user is distant from the user terminal 20 and thus it is highly probable that a guardian who has recognized this situation is unable to get in touch with the user.

When the connection strength data indicates that the inferred distance is small, the management server 30 may display that the user who is carrying the accessory device 10 with him or herself is close to the user terminal 20 through the application installed in the user terminal 20 or the guardian terminal 40. That is, it may be understood that the emergency rescue signal has been transmitted in a situation in which the user is close to the user terminal 20 and thus it is highly probable that the guardian who has recognized this situation will be able to get in touch with the user.

Accordingly, the management server 30 may assign a higher degree of emergency when it is determined that the distance between the user terminal 20 and the accessory device 10 is large than when it is determined that the distance between the user terminal 20 and the accessory device 10 is small. The management server 30 may determine whether the distance between the user terminal 20 and the accessory device 10 is large according to whether the RSSI value is greater than a reference value.

FIGS. 7A to 10 are diagrams illustrating components of an accessory device 10a according to a first embodiment.

The accessory device 10a according to the first embodiment may be an accessory device 10a configured to be detachably attached to the user terminal 20. The accessory device 10a may include a ring member 150, the ring member 150 may be rotated by a hinge member 140, and the hinge member 140 may be fixed when rotated. For example, the hinge member 140 may be configured such that a circular pin is insertable into an elliptical hole rather than a circular hole, a frictional force is secured when it is pressed, and an additional frictional force is applied when it is rotated. The hinge member 140 is not limited thereto, and various types of members, such as a spring pin, may be used provided as long as the ring member 150 can be rotated at an angle desired by a user and fixed.

According to an embodiment, a housing of the accessory device 10a may be configured to accommodate a magnetic material, and the magnetic material may be disposed outward along an outer circumferential surface of the accessory device 10a. The accessory device 10a may be detachably attached to the user terminal 20 through the magnetic material, and configured to rotate along the outer circumferential surface of the accessory device 101 when mounted on the user terminal 20.

The accessory device 10a detachably attached to the user terminal 20 should be designed not only with a low height in consideration of user convenience in portability but also such that components such as a battery 180, a switch 110, a button 160, the magnetic material, etc. can be mounted thereon. That is, it may be important to stably couple the battery 180, the switch 110, the button 160, the magnetic material, etc. to the housing with the components arranged as efficiently as possible in a limited space.

In the accessory device 10a, the button 160 for pressing the switch 110 may be exposed to the outside of the housing. The button 160 may be disposed on a substrate 170 on which the switch 110 is mounted, and a processor 120 and a communication module 130 may be mounted on the substrate 170 to be adjacent to the switch 100. Accordingly, a support member 165 supporting the button 160 in the housing may be disposed in a limited space on the substrate 170 while occupying as little space as possible.

For example, the support member 165 may not be directly connected to the substrate 170 but may be connected to an upper plate 11 of the accessory device 10a. The support member 165 of the button 160 may extend outward from a space in which the button 160 is exposed to the outside and be connected to the upper plate 11 by fastening a screw.

The battery 180 may be mounted under the substrate 170, and a battery fixing member 190 may be disposed to accommodate the battery 180 and supply power to the substrate 170. The battery fixing member 190 may be formed in a size corresponding to the size of the battery 180, and the substrate 170 may be disposed to be mounted on the battery fixing member 190. The battery fixing member 190 may be connected to an external housing by fastening a screw or a hook. For example, a first side of the battery fixing member 190 may be provided with a fastening groove in which a screw is to be fastened, and a second side thereof may be provided with a hook to be hung on the housing. Fastening grooves may be formed at corresponding positions on the substrate 170 and the battery fixing member 190, and the substrate 170 and the battery fixing member 190 may be coupled to the upper plate 11 through the fastening grooves.

That is, the battery 180, the battery fixing member 190, the substrate 170, and the button 160 may be disposed between the upper plate 11 and a lower plate 12 of the accessory device 10a, and the lower plate 12 constituting the housing, the battery fixing member 190, the substrate 170, the button 160, and the upper plate 11 may be sequentially stacked and assembled together.

According to an embodiment, the button 160 that may be pressed by a user may include a plurality of parts, and a plurality of switches 110 on which points of connection corresponding to the plurality of parts are formed may be mounted on the substrate 170. In this case, the accessory device 10a may generate a trigger signal in response to the pressing of all of the plurality of switches 110.

For example, when the button 160 is divided into two parts, two switches 110 corresponding to the two parts may be provided on the substrate 170. The accessory device 10a may generate a trigger signal in response to the pressing of both of the switches 110 by the two parts.

The accessory device 10a of the present disclosure is a device that a user carries with him or herself and may be used in an environment in which the button 160 is likely to be pressed mistakenly due to other factors while the accessory device 10a is carried. Because the button 160 of the accessory device 10a is located at a position lower than that of the upper plate 11, malfunction is more likely to occur when a point on the button 160 is pressed by mistake than when the entire button 160 is pressed by mistake.

The accessory device 10a may generate a trigger signal only when the button 160 of the accessory device 10a of the present disclosure includes multiple parts and all switches 110 that come in contact with the multiple parts are pressed, thereby preventing the trigger signal from being transmitted when any one point on the button 160 is pressed.

More specifically, when the button 160 includes a first part 160a and a second part 160b, the button 160 may malfunction when only one of the first part 160a and the second part 160b is pressed. Accordingly, a trigger signal is generated by the accessory device 10a of the present disclosure only when both the first part 160a and the second part 160b are pressed by a user, thus preventing malfunction of the button 160 as much as possible.

Figure 11:
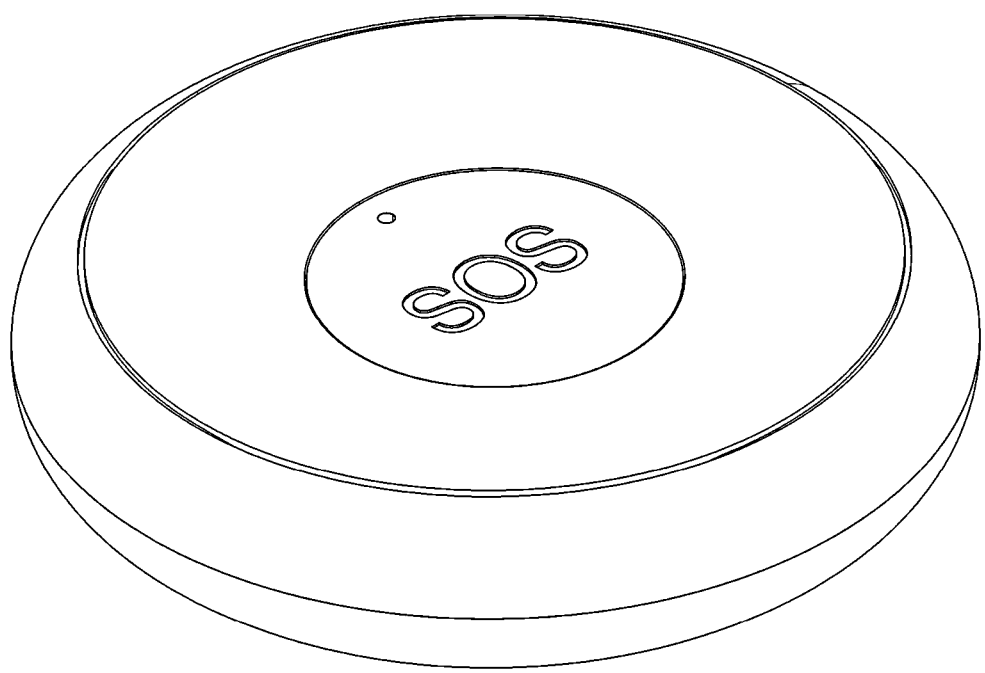
FIGS. 11 and 12 are diagrams illustrating components of an accessory device according to a second embodiment.
Figure 12:
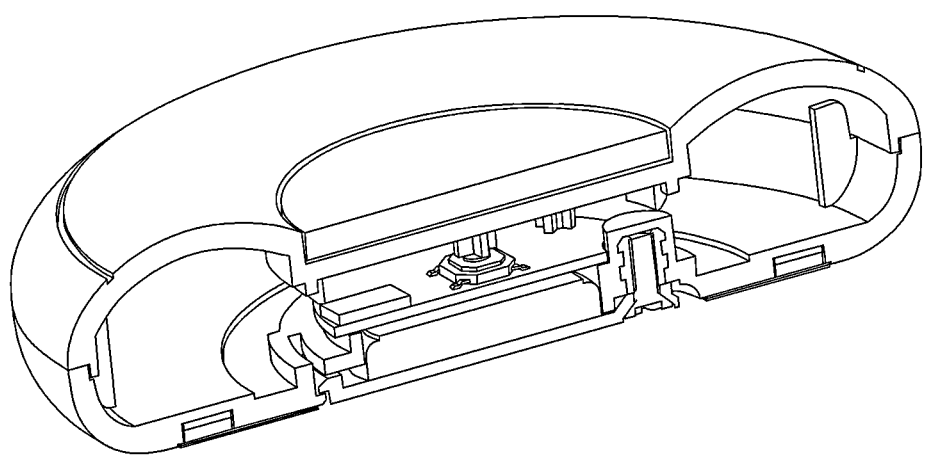

FIGS. 11 and 12 are diagrams illustrating components of an accessory device 10 according to a second embodiment.

The accessory device 10 according to the second embodiment may be formed in a size suitable for a user to carry with him or herself. A battery, a battery fixing member, a substrate, and a button may be placed between an upper plate and a lower plate of the accessory device 10, and the lower plate constituting the housing, the battery fixing member, the substrate, the button, and the upper plate may be sequentially stacked and assembled together.

In addition, a magnetic material may be disposed along an outer circumferential surface of the lower plate of the accessory device 10 and thus the accessory device 10 is attachable to a metal body due to the magnetic material.

Figure 13:
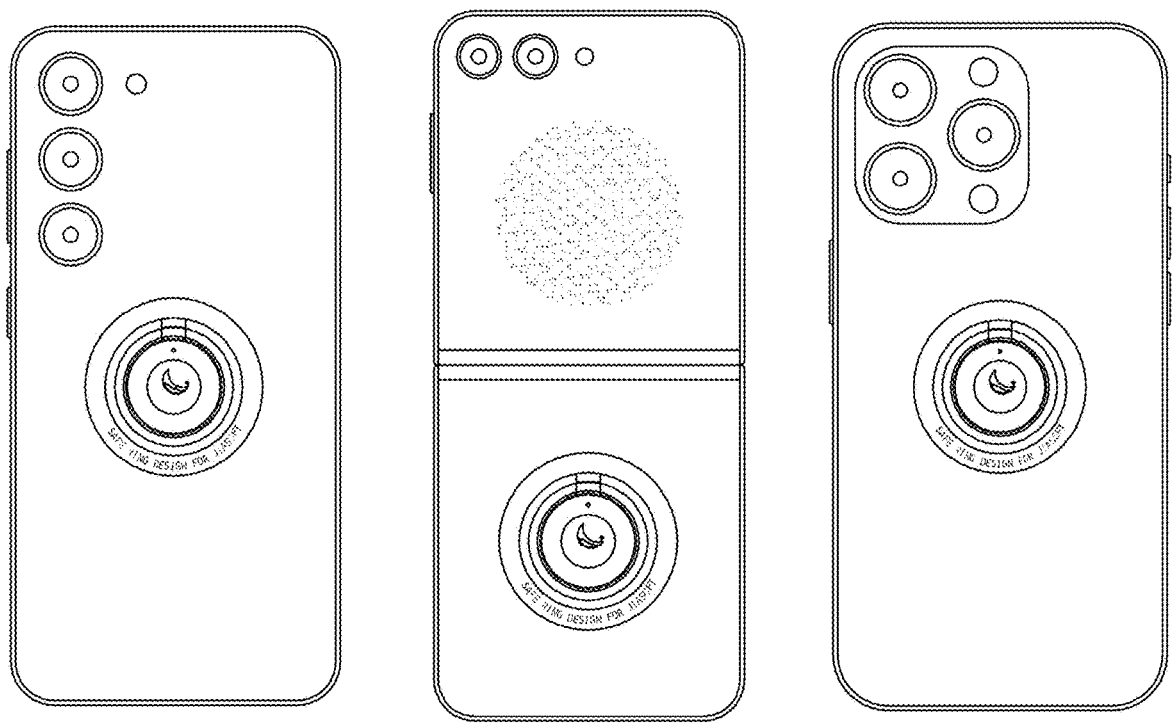
FIGS. 13 to 15 are diagrams illustrating examples of an accessory device that is in actual use according to embodiments of the present disclosure.
Figure 14:
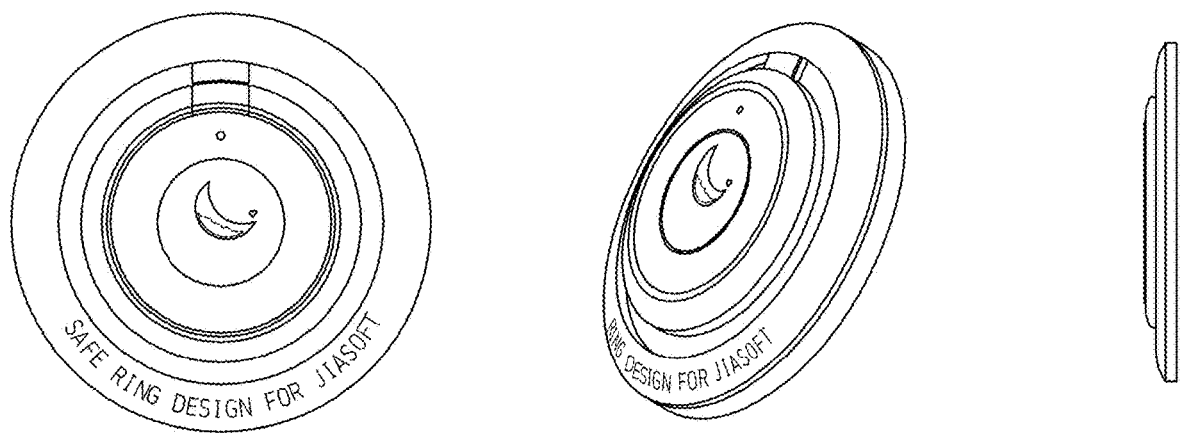
Figure 15:
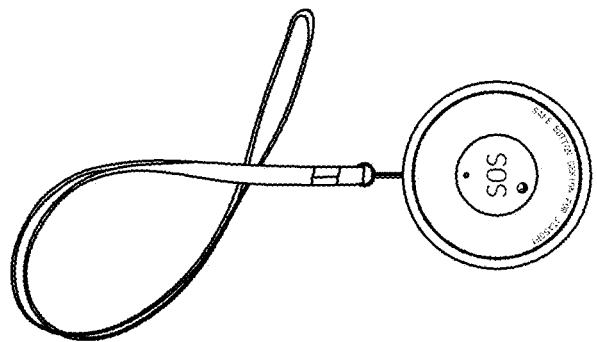
Figure 15:
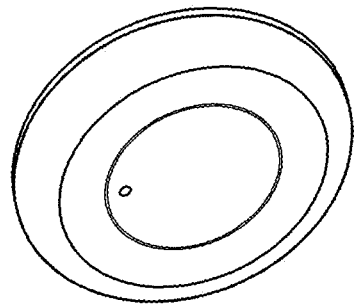
Figure 15:
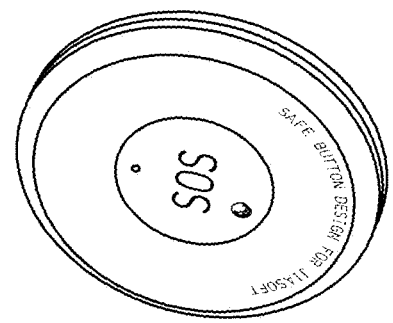
Figure 15:
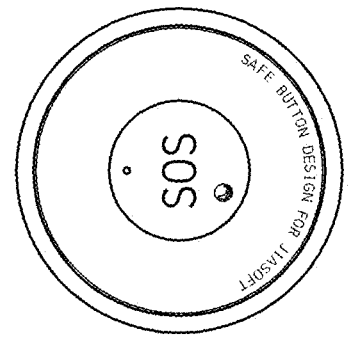

FIGS. 13 to 15 are diagrams illustrating examples of an accessory device that is in actual use according to embodiments of the present disclosure.

Referring to FIG. 13, an accessory device that is in actual use according to a first embodiment of the present disclosure may be provided to be detachably attached to a user terminal and be attached to various types of user terminals. For example, the accessory device according to the first embodiment may be mounted on a user terminal through a magnetic material, and a user may dispose the accessory device in a desired direction by rotating the accessory device while holding the accessory device.

The embodiment of FIG. 14 may be an example of the accessory device of the first embodiment that is actual use. The embodiment of FIG. 15 may be an example of an accessory device of a second embodiment that is actual use.

In a method of transmitting an emergency rescue signal according to an embodiment of the present disclosure, an emergency rescue signal is transmitted by an accessory device separate from a user terminal, and an accessory device which is capable of stably transmitting a signal while securing security for personal information, in which a button for generating a signal is provided in a large size and prevented from being pressed by mistake to prevent malfunction, and which is designed in portable size and weight can be provided.

Effects achievable from exemplary embodiments of the present disclosure are not limited to the above-described effects, and other effects that are not described herein will be clearly derived and understood by those of ordinary skill in the art to which exemplary embodiments of the present disclosure pertain from the following description. That is, unintended effects achieved when exemplary embodiments of the present disclosure are implemented are derivable by those of ordinary skill in the art from the exemplary embodiments of the present disclosure.

The methods according to various embodiments of the present disclosure described above may be implemented in the form of an application or software program installable in existing electronic devices.

All or part of each of the methods may be embodied as several software functional modules and implemented in an operating system (OS). Alternatively, each operation of each of the methods or a combination of the operations may be embodied as a software functional module, and implemented in the OS. Therefore, it will be understood that even when some embodiments of the present disclosure are not implemented as a single software function module, a method of the present disclosure is implemented when operations of the method are implemented by several software function modules and the several software function modules are implemented in one OS.

The methods according to the above-described various embodiments of the present disclosure may be implemented only by upgrading software or hardware for existing electronic apparatuses. The above-described various embodiments of the present disclosure may be performed through an embedded server equipped in an electronic device or an external server of the electronic device.

Meanwhile, according to an embodiment of the present disclosure, the above-described various embodiments may be implemented as software including instructions stored in a recording medium on which a computer or a device similar to a computer can perform recording using software, hardware, or a combination thereof. In some cases, the embodiments described herein may be implemented as a processor. According to software implementation, the embodiments of the procedures and functions described herein can be implemented as separate software modules. Each of the software modules may perform one or more of the functions and operations described herein.

The computer or the device similar to a computer should be understood as a device capable of calling instructions stored in a storage medium and operating according to the called instructions, and may include the devices according to the embodiments set forth herein. When an instruction is executed by a processor, a function corresponding to the instruction may be performed directly by the processor or under control of the processor. The instruction may include code generated or executable by a compiler or interpreter.

A machine-readable recording medium may be provided in the form of a non-transitory computer readable recording medium. Here, the term "non-transitory" means that the storage medium does not include a signal and is tangible but does not indicate whether data is stored in the storage medium semi-permanently or temporarily. In this case, the non-transitory computer-readable medium should be understood to be a medium that stores data semi-permanently and that is readable by a machine rather than a medium, e.g., a register, a cache or a memory, that stores data for a short time period. Examples of the non-transitory computer-readable medium may include a CD, a DVD, a hard disk, a Blu-ray disc, a USB, a memory card, and a ROM.

Exemplary embodiments are set forth in the drawings and the specification. Although embodiments have been described herein using specific terms, the terms are used only for the purpose of describing the technical spirit of the inventive concept and are not used to limit the meaning of the inventive concept or the scope thereof as defined in the appended claims. Therefore, it will be understood by those of ordinary skill in the art that various modifications may be made in the embodiments and other equivalent embodiments may be derived therefrom. Therefore, the technical scope of the present disclosure should be defined by the technical idea of the appended claims.

What is claimed is:

1. A method of transmitting an emergency rescue signal by an accessory
device communicating with a user terminal, the method comprising:
providing a trigger signal from the accessory device to the user terminal in response to a push input applied to a switch included in the accessory device;
generating at least one of image data and audio data related to a user's state on the basis of the trigger signal; and
providing, as an emergency rescue signal, user state data associated with the image data and the audio data to a management server,
wherein the generating of at least one of the image data and the audio data comprises:
generating first audio data by recording surround sound for a first time period on the basis of the trigger signal; and
generating second audio data by recording surround sound for a second time period longer than the first time period after the generation of the first audio data, and
wherein the generating of at least one of the image data and the audio data further comprises generating third audio data by recording surround sound for a third time period shorter than the first time period, in response to a failure of the transmission of the first audio data to the management server.

2. The method of claim 1, wherein the providing of, as the emergency rescue signal, the user state data associated with the image data and the audio data to the management server comprises encrypting the image data and the audio data as the user state data.

3. The method of claim 1, wherein the accessory device is connected to the user terminal through Bluetooth communication, and the method further comprises giving access authority to access the accessory device to the user terminal when an operation requested by the user terminal is performed by the accessory device.

4. The method of claim 1, wherein the generating of at least one of the image data and the audio data comprises generating, by the user terminal, at least one of the image data and the audio data unless an operation is input to the user terminal for a certain time period or more.

5. The method of claim 1, further comprising:
Identifying, by the management server, a guardian terminal requesting pairing with the user terminal; and
transmitting the emergency rescue signal to the guardian terminal by at least one of the management server and the user terminal, in response to approval of the request for the pairing with the user terminal from the guardian terminal.

6. The method of claim 1, further comprising, when the management server receives the emergency rescue signal a predetermined number of times or more, providing information about the user and location information of the user terminal to a security management center near a location of the user terminal.

* * * * *